(12) United States Patent
Hall, IV et al.

(10) Patent No.: US 6,481,149 B1
(45) Date of Patent: *Nov. 19, 2002

(54) TRANSPARENT FISHING HOOK INCLUDING TRANSPARENT STRUCTURAL COATING

(76) Inventors: James W. Hall, IV, 4424 E. Baseline Rd., Phoenix, AZ (US) 85400; Deborah K. Hall, 628 College Ave., Menlo Park, CA (US) 94025; James W. Hall, III, 1093 Royal Ct., Medford, OR (US) 97504-6130; Stephan S. Vylasek, 2059 Dorne Pl., Fremont, CA (US) 94539

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 404 days.

(21) Appl. No.: 08/574,606

(22) Filed: Dec. 12, 1995

Related U.S. Application Data (63) Continuation of application No. 08/202,447, filed on Feb. 28, 1994, now abandoned, which is a continuation-in-part of application No. 07/982,779, filed on Nov. 30, 1992, now abandoned, which is a continuation-in-part of application No. 07/644,204, filed on Jan. 22, 1991, now abandoned.

(51) Int. Cl.[7] .............................................. A01K 83/00
(52) U.S. Cl. ..................................................... 43/43.16
(58) Field of Search ............................... 43/43.16, 44.82

(56) References Cited

U.S. PATENT DOCUMENTS

| | | |
|---|---|---|
| 319,655 A | 6/1885 | Wright |
| 1,471,959 A | 10/1923 | Halferty |
| 1,513,400 A | 10/1924 | Koski |
| 2,274,255 A | 2/1942 | Pierce |
| 2,432,940 A | 12/1947 | Schomaker |
| 2,511,117 A | 6/1950 | Loeb |
| 2,747,320 A | 5/1956 | Boland |
| 2,763,089 A | 9/1956 | McDonald |
| 3,148,423 A | 9/1964 | Anspach |
| 3,564,749 A | 2/1971 | Fujii |
| D222,833 S | 1/1972 | Fujii |
| 3,820,269 A | 6/1974 | Rae |
| 4,028,838 A | 6/1977 | Flower |
| 4,225,647 A * | 9/1980 | Parent .......................... 428/336 |
| D276,360 S * | 11/1984 | Sitton .......................... 43/43.6 |
| 4,621,449 A | 11/1986 | Nakagawa |
| 4,768,304 A | 9/1988 | Preiser |
| 4,833,816 A | 5/1989 | Sitton |
| 4,928,423 A * | 5/1990 | Furuta ......................... 43/43.16 |
| 4,953,321 A * | 9/1990 | Furuta ......................... 43/43.16 |
| 5,084,998 A * | 2/1992 | Dixon ......................... 43/43.16 |
| 5,097,622 A * | 3/1992 | James ......................... 43/43.16 |
| 5,165,197 A | 11/1992 | Sitton |
| 5,388,366 A * | 2/1995 | Kretschmer ................. 43/43.16 |

FOREIGN PATENT DOCUMENTS

| | | | |
|---|---|---|---|
| CA | 486258 | 9/1952 | |
| GB | 292372 | 6/1928 | |
| GB | 1200511 | * 7/1970 | ................. 43/43.16 |
| GB | 2158683 | 11/1985 | |
| JP | 0158878 | * 12/1981 | ................. 43/43.16 |

* cited by examiner

Primary Examiner—Kurt Rowan
(74) Attorney, Agent, or Firm—Keith A. Cushing (57) ABSTRACT

A transparent fishing hook is shown and described as being integrally formed of a material capable of passing images therethrough. In this manner, the hook becomes less visible against a given visual environment. The hook is shown in several embodiments including several flesh engaging configurations and line attachment configurations. Selection in index of refraction relative to a given body of water in which the hook is to be used enhances the "invisibility" of the hook when used in that body of water. A transparent urethane coating is applied to the transparent fishing hook to improve its resistance to deformation when engaging a fish in use thereof.

11 Claims, 5 Drawing Sheets

TRANSPARENT FISHING HOOK INCLUDING TRANSPARENT STRUCTURAL COATING

RELATED APPLICATIONS

This is a continuation of U.S. patent application Ser. No. 08/202,447 filed Feb. 28, 1994 now abandoned by inventors Hall, et al and entitled TRANSPARENT FISHING HOOK INCLUDING TRANSPARENT STRUCTURAL COATING.

The present application is a continuation-in-part of and allowed U.S. patent application Ser. No. 07/982,779 now abandoned filed Nov. 30, 1992 (now abandoned) which is a continuation-in-part of abandoned U.S. patent application Ser. No. 07/644,204 filed Jan. 22, 1991.

FIELD OF THE INVENTION

This invention relates generally to fishing tackle, and more particularly to fishing hooks.

BACKGROUND OF THE INVENTION

Recreational fishing has developed an extensive following of enthusiastic "anglers" over the years. Indeed, according to the U.S. Fish and Wildlife Service, nearly sixty million people engage in the sport of fishing in the United States alone, that number having doubled in only the past 30 years. The collective activity of anglers totals about one billion days of fishing each year, in turn generating thirty billion dollars to the economy. These numbers suggest the heavy demand placed on fishing equipment manufacturers to improve upon the quality and variety of fishing tackle available. One need only examine the vast number of fishing magazines and publications that exhibit and advertise a plethora of fishing gear to both expert and novice alike to recognize the size and strength of this market. The worldwide market for both sport and commercial fishing is a multiple of these U.S. markets.

Anglers use a variety of fishing equipment or tackle, most notably the fishing hook but also the fishing rod, line, reel and net. Fishing rods are used to cast a lure, into the water by attaching the lure to a fishing hook which is tied on a fishing line, which is in turn, itself attached to the rod. The lure is suspended in the water in a manner designed to attract fish, with the hope that the fish will then swallow it. Once swallowed, the angler reels in the fish line, to which the fish is now "attached" by virtue of the swallowed fishing hook. The term "lure" is used to identify an "attraction" device including artificial flies, plugs, spoons, spinners, other artificial fishing attractors and natural bait. In any event, it is important to distinguish between a lure and a hook. In every case, a lure operates to attract a fish while a hook must, to the greatest extent possible, be hidden from view by the fish. The term "line" includes the leader.

For sports fishermen, the "sport" exists both in tricking the fish into taking the lure, as well as in the manner by which the fish is retrieved after the fish has been hooked. The equipment used—fishing hook, lures, line, rod, and reel—can each have a dramatic impact in both areas. Fishing rod designs range from simple cane rods to sophisticated fly rods, casting rods and trolling gear. A lure can be both artificial and live, and line varies in both weight and optical characteristics. A weight or sinker is often used to draw the bait below the surface of the water, when the fisherman is seeking a non-surface feeding fish. Where the fish sought does not feed off the bottom of the lake or sea, a float, or bobber, may be attached to the line and used to maintain the bait above the surface of the sea floor. Other lures are designed to float on the surface, e.g., "dry flies." Frequently a gaff or a landing net will be used to "land" the fish (bring it out of the water) after it has been brought to the fisherman by the reeling in the line.

The fishing hook, however, is the most essential component of all the anglers equipment. It must be as non-obtrusive and hidden as possible in order to not detract from the natural appearance of the lure in attracting the fish. The fishing hook must have sufficient sharpness and strength to engage and hold the fish until "landed." All of the other fishing equipment follows from the most effective fishing hook possible, and is useless when the hook is perceived by the fish. While there are now a wide variety of styles available, conventional fishing hooks for catching the fish are of a well-known configuration, similar to that illustrated in FIG. 1. The conventional hook is traditionally manufactured from metal, such as steel or a nickel-coated or a black-anodized bronze, and is generally recognized by its slender J-shaped configuration. At one end of the hook is an eyelet used to secure the fishing hook to a length of fishing line. The opposite end of the hook terminates in a sharpened point, which often includes a sharpened barb extending rearwardly from the point as well. The barb better secures the hook in the flesh of the fish, preventing the fish from easily throwing the hook.

In many places across the United States, the lakes, streams and estuaries are regulated by the local and federal governments to prevent the depletion of the indigenous fish by overfishing. In order to protect the fish population in these areas, the regulations restrict both the size and number of fish permitted to be retained by an angler. In fact, in certain preserved areas, the anglers are required to return all of the fish to the water after being caught. In response to some of these control measures, a variety of barbless hooks have been developed that permit an angler to experience the pleasures of fishing, yet minimize the physical harm to the fish. Maintaining the fish in a sufficiently healthy condition increases the likelihood that the fish, if returned to the water, will survive the trauma of its temporary capture.

Other types of tackle, i.e., lures, incorporate the shape and features of live bait directly on the hook or on a structure having a hook secured to it. Thus, a lure is distinguished over a conventional fishing hook in that the function of a lure is to be visible to a fish and thereby attract the fish. The fishing hook, however, should not be seen by the fish. By providing an artificial bait that simulates live bait, such lures attract the fish and deceive the fish into taking the associated hook. A lure disclosed in U.S. Pat. No. 2,511,117 issued Jun. 13, 1950 to Loeb shows a hook integrally formed within and as part of the overall shape of a simulated insect body. In this regard, Loeb proposes making a hook compatible in visibility with respect to the associated lure. Loeb proposes that such a hook would be translucent and take on an appearance similar to a translucent simulated insect body. Loeb also proposes that such a translucent appearing fishing hook be incorporated into a fly lure. Thus, Loeb addresses the issue of hook visibility by making the hook's appearance conform to that of the associated lure.

Frequently used by fly-fishermen in the pursuit of trout and other fresh and salt water fish, artificial fly lures present an alternative to the conventional hook by eliminating the need to somehow attach such lightweight live bait to a hook. To the extent that the fly is not damaged from use, such flies are reusable.

Fly-fishermen are more particular and find satisfaction and pleasure from a lure appearing as an insect floating on water, known as a "dry fly" or submerged as a "wet fly." Many devoted fly-fishermen build and attach their own "fly" to the hook. A plain, unadorned fishing hook is all that is required. The creative fishermen uses thread, feathers and other materials and accouterments to make the fly as attractive as a live insect.

While they are aesthetically pleasing to the angler, even craftily-designed lures often fail to obscure the false note of a metal hook. As a result, wary fish escape capture, failing to take the bait, when at the last minute, the hook is perceived. The metal or opaque hook is the most deforming and unnatural feature of the lure presentation.

Responsive to the persistent demands of anglers for improved fishing tackle that will more effectively attract fish, as well as provide greater structural durability over previous hooks, variations in the shape of fishing hooks and in the choice of materials have been proposed, but metal hooks are by far the most available and common form of fishing hook used. For example, plastic fishing hooks have been suggested, such as those disclosed in the above-noted Loeb patent, which seek to emulate insect appearance in the hook by use of translucent plastic material. However, depending on the choice of plastic material, the hook may lack sufficient structural strength and durability. There have been attempts to restructure the plastic hook to provide a stronger, more effective device for snaring fish. U.S. Pat. No. 4,833,816 issued May 30, 1989 to Sitton et al discloses a structural variation, i.e., flexibility, in the configuration of J-shaped plastic fishing hooks, but does not address the issue of hook visibility to the fish. The concept of transparent bodies surrounding a lure has been developed, such as those disclosed in U.S. Pat. No. 3,820,269 issued Jun. 28, 1974 to Rae. The Rae lure spatially separates the hook from an alluring simulated lure by embedding the lure in a body of transparent material and attaching the hook to the body of transparent material. The Rae hook, however, is a conventional metal hook.

As a result, while a wide variety of fishing hooks have been proposed, but the effectiveness of most proposals are limited by their material or configuration and metal hooks remain as the only commercially available fishing hook. Most proposed hooks are capable of addressing only one particular limitation, while failing to address others. For example, while some proposed hooks are constructed of plastic to overcome some of the less desirable characteristics of metal, they fail to exhibit a sufficiently durable structure. While transparency in a body surrounding a lure theoretically enhances the ability to disassociate a lure and a hook, embedding a lure in a transparent body may actually increase its visibility to the fish due to refractive characteristics of the body.

Figure 1:
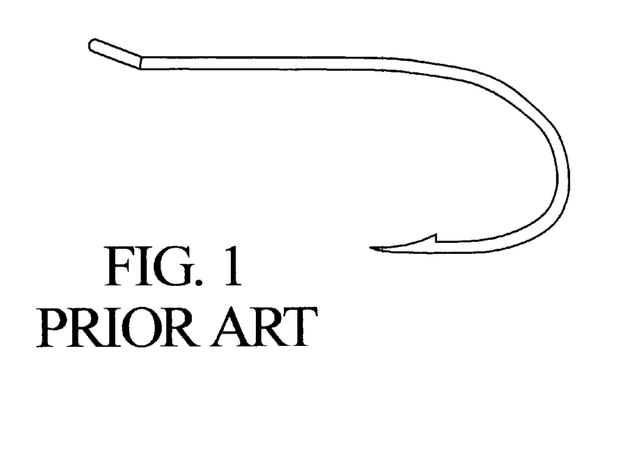
FIG. 1 is a front view of a conventional fishing hook of the prior art.

In addition, despite some of the advantages of the improved hooks, none seem to best incorporate a means for conveniently attaching a fishing line to the hook itself. Normally, an eye is provided in the shank of the fishing hook, as shown in FIG. 1, through which one must thread the end of a fishing line. In less than adequate lighting, this method proves cumbersome at best. Like threading a sewing needle, it is sometimes difficult to thread a clean unravelled fishing line through the eye, wasting precious time in the event that a previous hook is lost and the fish are biting actively.

Thus, while the art of fishing is ancient, the most critical component of fishing equipment, i.e., the fishing hook, remains substantially static in design. The great variety of prior proposed fishing hook improvements have not successfully replaced the conventional metal fishing hook. As a result, the most critical aspect of hooking a fish, i.e., attracting with a visible lure and deceiving the fish into swallowing an associated fishing hook, remains a challenge. Fisherman put forth great effort in hiding such conventional hooks from view due to the high visibility of conventional fishing hooks as presented to the fish in the water environment, but hook visibility remains to the advantage of the fish. Accordingly, it is desirable that a fishing hook exhibit the requisite capabilities of engaging and retaining the fish, but still exhibit the desirable characteristic of disguise in deceiving the fish into initially swallowing the fishing hook.

SUMMARY OF THE INVENTION

The preferred form of the invention comprises a transparent fishing hook having a generally curvilinear or "J-shaped" configuration. The transparent fishing hook of the present invention is characterized by the visibility of images therethrough. As a result, the hook itself disappears against its visual background. In the context of use, the ability of a fishing hook to transmit surrounding images therethrough better hides the hook from view relative to prior fishing hook configurations. In accordance with the invention, the refractive index for the fishing hook may be selected with reference to a proposed surrounding body of water whereby the "invisibility" of the hook is greatly enhanced. A means for securing a fishing line to the hook lies at the end of the shank. In one embodiment, the shank is curvilinear in shape, while in another embodiment, the shank is substantially straight. At the other end of the shank lies a means for securing a fish. In the preferred embodiment, the means for securing a fish is a barbed end, having a rearwardly-extending sharp point. Where an angler desires to minimize the physical damage to the fish, an alternative embodiment may be used that eliminates the rearwardly-extending point of the preferred embodiment.

A portion of the shank may include a tapered reinforcement rib integrally formed with the main body. The height of the rib, i.e., the distance that the rib extends away from the shank, varies along the length of the rib. Preferably, a plurality of ribs are positioned at locations generally subject to increased stress from the resistance and forces applied by a "hooked" fish. For example, the main bend in the hook, i.e., the lower portion of the "J" configuration, is subject to severe stress as the fish resists efforts to be caught. A rib is advantageously positioned about this bend with the height of the rib being at a maximum adjacent to this bend in the shank.

The means for securing a fishing line to the fishing hook may be an aperture according to conventional shape and position, or alternatively comprises a non-continuous cap portion integral with the shank. An aperture in the shank located adjacent to the cap portion cooperates with an opening in the cap, permitting a midportion of a fishing line to be drawn conveniently into the aperture in the main body. Such an arrangement eliminates the need to carefully thread the end of the fishing line through an eye as is normally required with conventional fishing hooks. In an alternative embodiment, the means for securing a fishing line comprises a conventional aperture formed at the end of the fishing hook shank.

The preferred embodiment of the present invention is constructed of a transparent material characterized by its clarity and high impact strength. In alternative embodiments, the improved fishing hook is constructed of a variety of materials. The transparent qualities of the improved fishing hook minimize or eliminate the visibility of the hook, especially when used with either live or artificial lure. Additionally, the acute planar interface angles, which could refract the light passing through and increase its visibility, are eliminated, further enabling the improved fishing hook to remain hidden within the lure.

In accordance with the present invention, a fishing hook made of transparent material is further enhanced in structural rigidity by the addition of a transparent coating. Such a coating preferably has some resiliency as applied to the fishing hook, but overall improves structural rigidity of the fishing hook against deformation. In the preferred form of the present invention including a coating material improving structural characteristics, a urethane coating is applied by dipping the fish hook into a liquid urethane bath. Several such dipping steps may be applied to build a coating on the fish hook in one or more layers.

By incorporating the above-identified features, the present invention provides an improved fishing hook that is structurally superior to previous proposed plastic fishing hooks and offers the advantage of minimizing or eliminating its visibility to the fish in comparison with the live or artificial lure secured to the fishing hook. In addition, a more convenient means is provided to secure a fishing line to the fishing hook and minimize the preparation time before casting the lure. These and other advantages of the present invention will be more fully appreciated by reference to the accompanying drawings and the detailed description.

The subject matter of the present invention is particularly pointed and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE INVENTION

The present invention comprises a fishing hook representing a structural and functional improvement over conventional fishing hooks in the prior art. In FIG. 1, a conventional fishing hook is illustrated having a substantially J-shaped configuration with an eye at one end for tying a fishing line to the fishing hook and a double-pointed barb at the other end. The fishing hook illustrated in FIG. 1 is exemplary of conventional metal hooks having a slender wire appearance. As may be appreciated, a metal hook is incapable of transmitting any light therethrough. Furthermore, many conventional metal fishing hooks have a "blackened" appearance. Thus, a metal fishing hook is quite visible in a body of water.

Figure 2A:
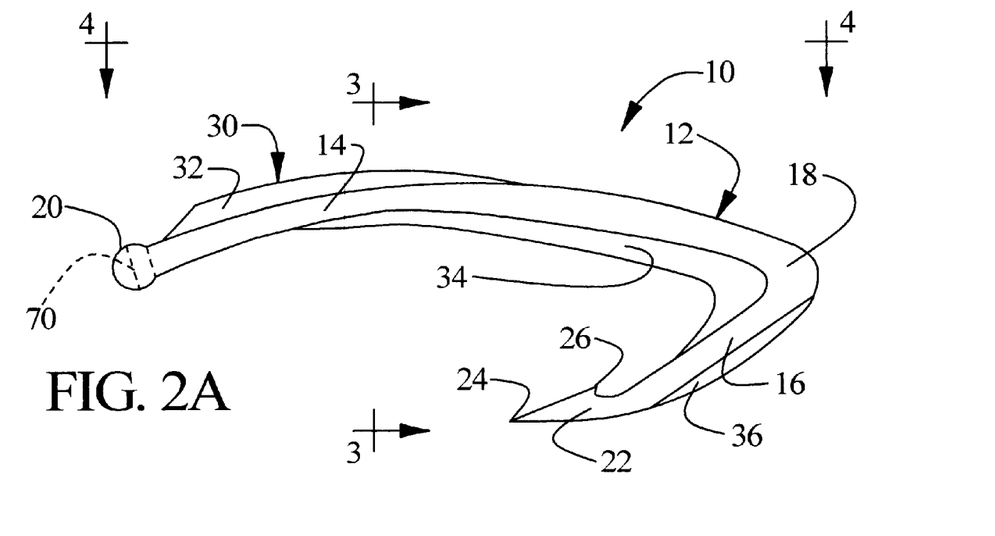
FIG. 2A is a front view of a first embodiment of the present invention.
Figure 3:
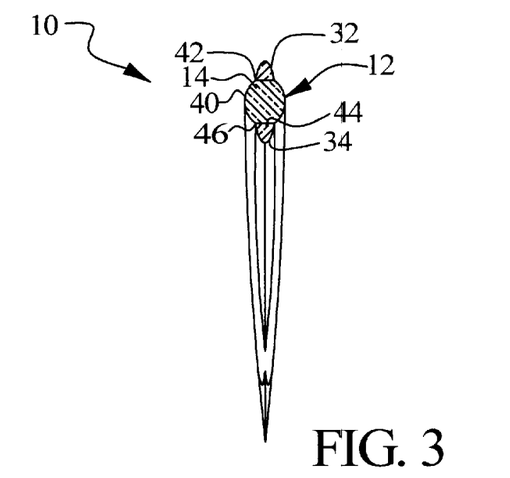
FIG. 3 is a sectional view of the fishing hook of FIG. 2A as taken along lines 3—3 of FIG. 2A.

Referring to FIG. 2A, the present invention is significantly different from the conventional fishing hook of FIG. 1. The first illustrated embodiment of the present invention is an improved fishing hook 10 having a main body 12 of generally curvilinear configuration throughout and further comprising a shank 14 separated from a leg 16 by a bend 18 located therebetween. While the main body 12 is curvilinear in a front plane, as illustrated in FIG. 2A, it is substantially flat with respect to an orthogonal plane, as illustrated in the sectional view of FIG. 3.

Figure 2B:
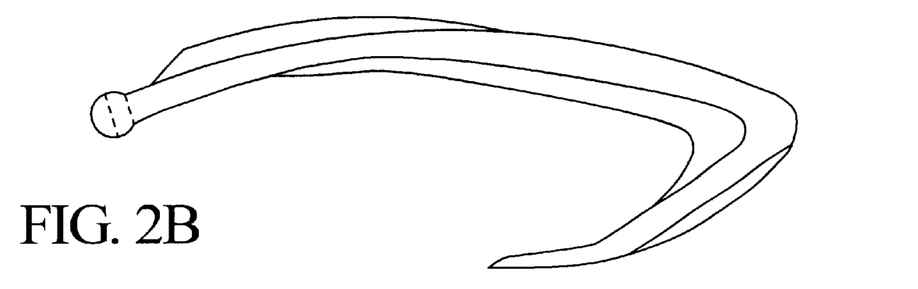
FIG. 2B is a front view of a second embodiment of the present invention.

The improved fishing hook 10 further includes a shank end 20 carrying a means for securing a fishing line (not shown) to the fishing hook 10. This manner of attachment is more fully described in FIGS. 5A and 5B, below. At the other end of the fishing hook 10 is a means for engaging the mouth of a fish when the hook 10 is swallowed by the fish (not shown). Such an engaging means comprises a barb 22, preferably double-pointed with a forward point 24 and a rearward point 26 each extending in substantially opposite directions. With a double-pointed arrangement as shown in FIG. 2A, the forward point 24 allows entrance of the barb 22 into the flesh of the fish, while the rearward point 26 and oppositely directed, prevents removal of the barb 22. In this manner, the hook 10 is engaged in both directions, thereby securing the fish to the hook 10. It is contemplated that the engaging means is barbless, as shown in the embodiment of FIG. 2B, and comprises only a forward-extending point. Without a second rearwardly-extending point, flesh damage to a fish by a rearward point 26 upon removal of the fishing hook 10 is avoided.

Figure 4:
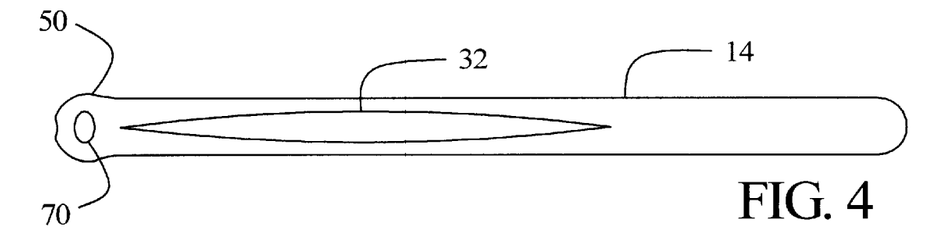
FIG. 4 is a cross-sectional elevational view of the fishing hook of FIG. 2A taken along lines 4—4 of FIG. 2A.

The fishing hook 10 incorporates additional reinforcement structures extending in a tapered fashion away from the main body 12, as best shown in FIG. 4, and which have varying heights. Referring still to FIG. 2A, the embodiment has a first reinforcement rib 32 positioned proximate to the securing means 14 and extending along a significant portion of one side of the shank 14. A second reinforcement rib 34 is positioned on the opposite side of the shank 14 from the first rib 32, and commences on the shank 14 at a point further away from the shank end 20 than does the first reinforcement rib 32. However, rather than extending only along the shank 14, the second reinforcement rib 34 continues in an arcuate fashion toward the leg 16, following, to a certain extent, the contour of the hook bend 18. The second reinforcement rib 34 terminates on one side of the leg 16 proximate to the engaging means 22. A third reinforcement rib 36 is positioned entirely along the opposite side of the leg 16, commencing proximate to the bend 18 and terminating proximate to the barb 22, substantially opposite the termination point of the second reinforcement rib 34.

Referring now to FIG. 4, the relationship between the main body 12 and reinforcement ribs 30 may be more fully appreciated. The main body 12 is configured with a generally bulbous cross-section throughout having substantially spherical sides 40 and a generally rounded top 42 surface and a bottom surface 44. The height of the reinforcement ribs 30, i.e., the distance the reinforcement rib extends away from the main body 12, varies along the length of each reinforcement rib. As such, the cross-section of FIG. 4, taken along line 4—4 of FIG. 2A, shows the first reinforcement rib 32 having a height less than the height of the second reinforcement rib 34. Preferably the fishing hook 10 is of unitary construction so that the reinforcement ribs 30 are integral with the main body 12, thereby eliminating the top and bottom surfaces 42, 44 in such locations. Since the interior surfaces are eliminated, the amount of light refracted by the fishing hook 12 as light passes therethrough is thereby reduced. A boundary 46 is formed between each of the reinforcement ribs 30 and the main body 12, and this intersection is contoured smoothly to further reduce light refraction. The reinforcement ribs advantageously improve structural durability and strength at high stress locations without significantly degrading transparency.

Figure 5A:
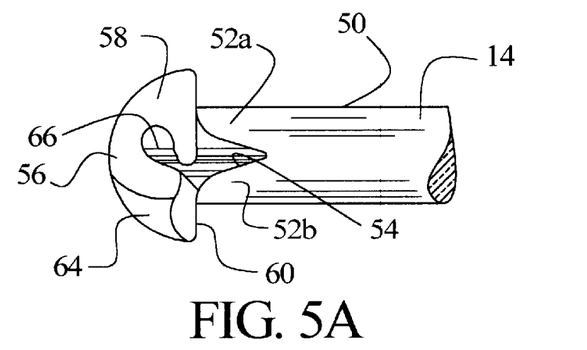
FIG. 5A is an exploded view of a first means for securing a fishing line to a fishing hook of the present invention.
Figure 5B:
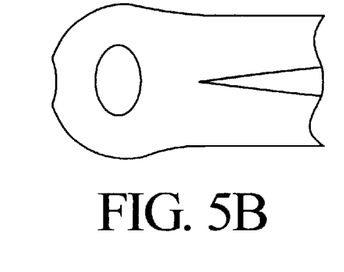
FIG. 5B is an exploded view of the an alternative means for securing a fishing line to the improved fishing hook.

Referring now to FIGS. 5A and 5B, a first illustrated fishing line attachment mechanism is shown. As shown in FIG. 5A, the end shank 20 is configured in a Y-shape having a pair of arms 52a and 52b and a shank end opening 54 formed therebetween. Constructed integrally with the ends of each arm 52a and 52b is a button-shaped cap 56 having a substantially hemispherical outer surface 58 and a discontinuous cap perimeter 60. Extending inwardly from the perimeter 60 is a cap slot 64 that terminates in a manner forming an enlarged cavity 66 within the cap 56. The cap slot 64 is in physical communication with the opening 54 of the shank 14 so that a mid-portion of a fishing line (not shown) may be easily slipped into the slot 64 and passed through to the opening 54. The fishing line may then be secured to the fishing hook 10 by simply tying the fishing line into a secure knot about the shank 14. The cap 56 prevents the knot from slipping off of the shank 14, leaving the fishing line securely tied to the fishing hook 10. With this preferred arrangement of the securing means 20, a fishing hook user may readily fasten a fishing line to the fishing hook 10 without threading an end of the fishing line through an eye, normally associated with conventional fishing hooks. As such, the fishing line may be secured to the fishing hook 10 even when adequate light is unavailable as is often experienced in early morning and late night periods.

A second fishing line attachment mechanism is illustrated in FIG. 5B comprising an aperture 70 formed in the shank end of the main body 12. This arrangement resembles the "eyes" provided in conventional fishing hooks. With adequate lighting and a skilled hand, the alternative securing means is effective in securing a fishing line to the fishing hook 10.

The preferred embodiment of the present invention is constructed of a transparent material. As used herein, the term "transparent" or "transparency" shall be distinguished from the term "translucent" or "translucency." A transparent material is characterized by its ability to convey images therethrough. A translucent material conducts light, but does not permit viewing of images therethrough. The transmission of images through a fishing hook, as contemplated under the present invention, significantly advances the art of hiding a fishing hook from view. The images seen through a fishing hook as constructed under the present invention would be the images of the surrounding visual environment. Accordingly, the transparent fishing hook becomes less visible against the surrounding visual environment. Prior fishing hooks exhibiting the characteristic of translucency are incapable of transmitting the surrounding visual environment, and are therefore necessarily more visible than a fishing hook constructed in accordance with the present invention. The hook 10 may be also constructed of a polycarbonate compound characterized by high clarity, heat- and flame-resistance, dimensional stability, and exceptionally high impact strength over a wide temperature range. The fishing hook 10 may be also constructed of a polyetherimide compound or other material exhibiting similar characteristics. It is contemplated, however, that the improved fishing hook could also be manufactured with fiber-reinforced nylon, glass-reinforced teflon fibers, aerogel or various resins. Other materials considered suitable for construction of a transparent fishing hook 10 include a variety of strong transparent resins, Kodak (TM) PETG copolyester, glass-reinforced polycarbonate, glass-reinforced nylon, fiber-reinforced polycarbonate, reinforced polypropylene, long fiber-reinforced nylon, a variety of long fiber compounds, glass fiber-reinforced polypropylene, and reinforced thermoplastics.

The transparent aspects of the present invention minimize or eliminate the visibility of the hook when used with live or artificial lures. The improved fishing hook is configured to advantageously eliminate substantially all abrupt surface changes that would tend to undesirably refract the light passing through and increase its visibility. As such, the main body and the tapered rib have smooth contours. In addition, the angle of interface between the main body and the tapered rib is minimized so as to minimize refraction of light and, therefore, reduce visibility.

Manipulation of the index of refraction for the material used in the construction of fishing hook 10 enhances the ability of the fishing hook 10 to become virtually invisible within a body of water. More particularly, it has been determined that by selecting the refractive index of the material used in the construction of fishing hook 10 with reference to the refractive index of the body of water surrounding fishing hook 10, fishing hook 10 can become virtually invisible. In the most preferred embodiment, the refractive index of the fishing hook 10 matches the refractive index of the body of water in which it is used. The refractive index of plain water is 1.333 and of saltwater is 1.336, these indices provide a guide in selecting an index of refraction for fishing hook 10.

When a submerged material has exactly the same index of refraction as the surrounding water, there is virtually no refraction of light through the material, even on sharp angles. The phenomenon of light refraction occurs when light passes from one material to another, but only when the index of refraction for these abutting materials differs. Thus, it is contemplated that the present invention may be provided in a variety of forms providing selection among given indices of refraction. For example, one version of the present invention could have an index of refraction at 1.333 for use in plain water. Another form of the invention could have an index of refraction at 1.336 for use in saltwater. As may be appreciated, other bodies of water, e.g., muddy water, may be determined to have particular refractive characteristics depending on the nature of the water and the conditions present. As may be appreciated, versions of the present invention can be specially suited to any particular body of water by having an index of refraction which substantially matches that of the surrounding water. For example, fishing hooks 10 could be designated specifically for use in salt or plain water. Alternatively, a collection of fishing hooks 10 could be provided having graduated selection among index of refraction. The fishermen could select from this inventory of fishing hooks 10 one which has a suitable index of refraction for use under the current conditions. In yet another alternative, a selected index of refraction for fishing hook 10 may be on the order of the above noted indices of refraction so as to provide a general purpose fishing hook 10 suitable for use in a variety of water conditions.

Modern plastics injection molding techniques now exist for manipulating the index of refraction for a variety of materials. It is contemplated that such manipulation of the index of refraction is available in implementation of the present invention.

Figures 6, 7:
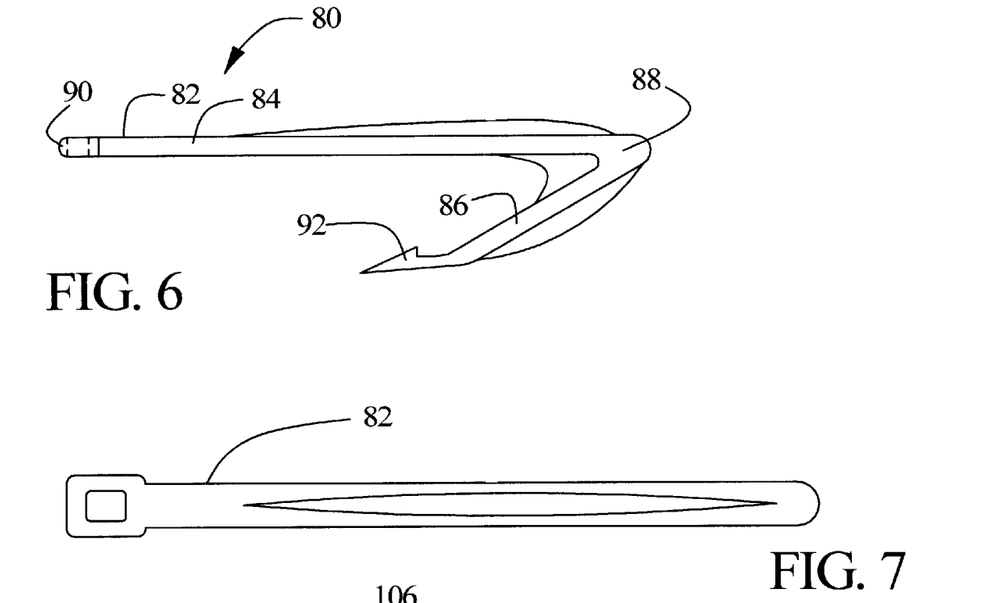
FIG. 6 is a front view of an alternative embodiment of the improved fishing hook.
FIG. 7 is a side view of the fishing hook of FIG. 6.

Referring now to FIGS. 6 and 7, another embodiment of a fishing hook under the present invention is shown. In FIG. 6, an improved fishing hook 80 comprises a main body 82 having a substantially straight shank 84, a substantially straight leg 86 and a bend 88 therebetween. Positioned at the end of the shank 84 is a shank end 90 that is provided with a means for securing a fishing line to the fishing hook 80, such as the alternative configurations illustrated in FIGS. 5A and 5B. At the end of the straight leg 86 is a barb 92 for engaging a fish similar in configuration to the barb 22 incorporated within the preferred embodiment of the fishing hook 10. The alternative embodiment of the fishing hook 80 offers the advantages of the preferred fishing hook 10 but merely in a different overall configuration.

Figures 8, 9:
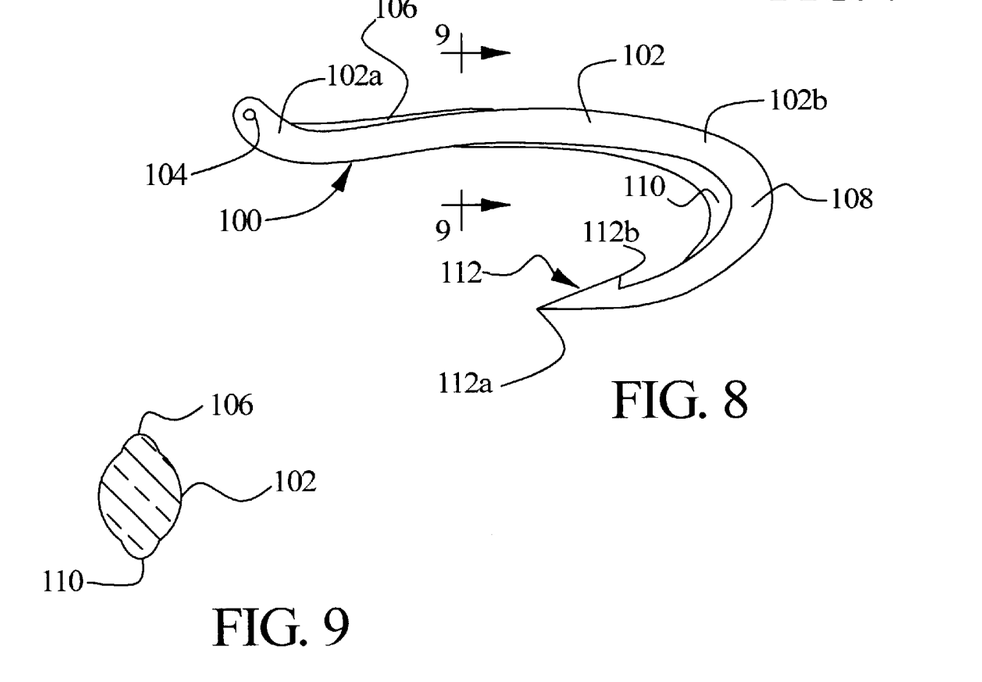
FIG. 8 is a side view of a third embodiment of the present invention.
FIG. 9 is a sectional view of the fishing hook of FIG. 8 as taken along lines 9—9 of FIG. 8.

FIGS. 8 and 9 illustrate yet another embodiment of the present invention, an improved fishing hook 100. In FIG. 8, the fishing hook 100 includes a shank 102 of generally circular cross section. A proximal end 102a of shank 102 carries an eyelet 104 for attachment to a fishing line. A tapered rib 106 lies along the upper, as viewed in FIG. 8, surface of shank 102 near the proximal end 102a of shank 102. An arcuate section 108, of generally circular cross section but tapering in diameter, extends from the distal end 102b of shank 102. At the inside surface of arcuate section 108, a tapered rib 110 is provided for strengthening arcuate section 108 against deformation in use of the hook 100. At the distal end of arcuate section 108 a flesh piercing 112 is formed including a leading point 112a and a barb 112b. As may appreciated, the hook 100 may be formed without the barb 112.

As shown in FIG. 9, the shank 102 is circular in cross section and the ribs 106 and 110 are generally circular in cross-section, co-planar and on opposite sides of the shank 102.

Figure 10:
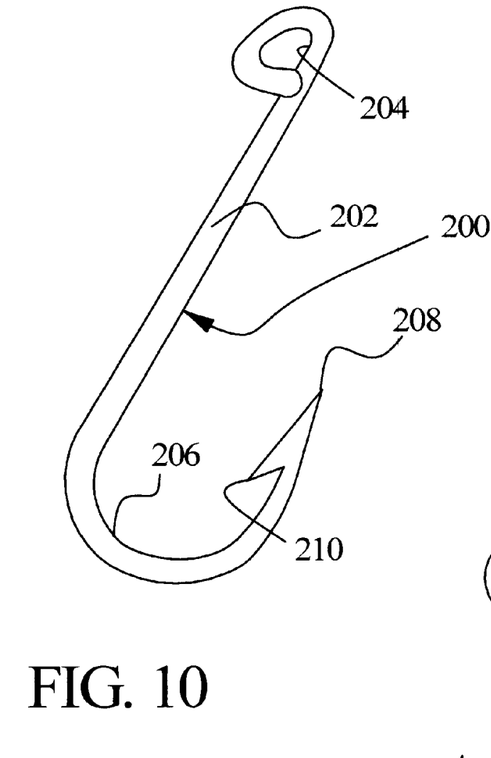
FIG. 10 is a perspective view of another embodiment of the present invention of generally more slender design made possible by application of a urethane structural coating thereto.
Figure 11:
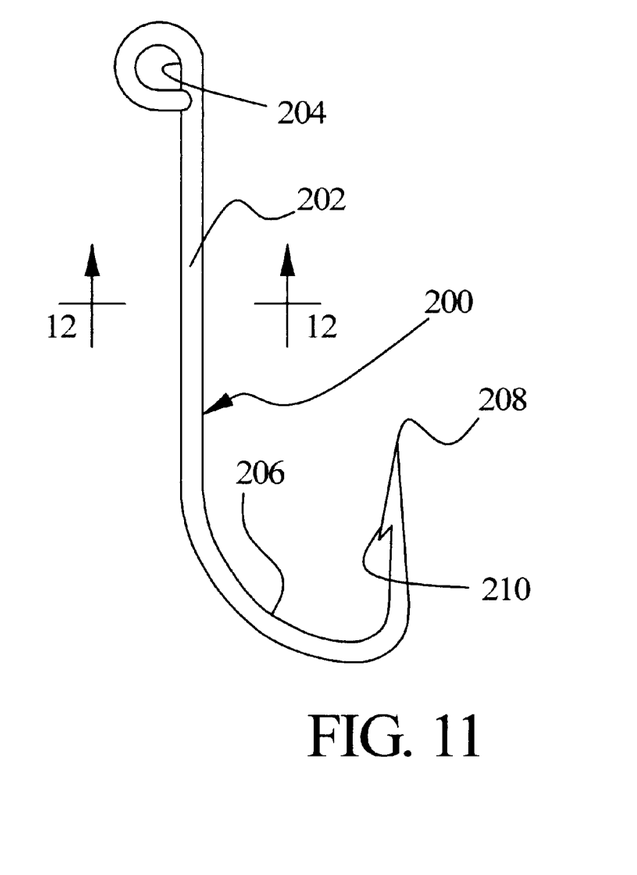
FIG. 11 is a side view of the fishing hook of FIG. 10.

FIGS. 10 and 11 show an alternative, more slender, embodiment of the present invention including a urethane coating thereon in aid of a more rigid overall fishing hook structure. In FIGS. 10 and 11, a fishing hook 200 includes a generally straight circular cross section shank 202, an eyelet 204 formed at the upper end of shank 202 by curving shank 202 back 270 degrees into itself, a curvilinear hook portion 206 at the lower end of shank 202 terminating in a sharpened point 208 including a barb 210. As may be appreciated, the fishing hook 200 is a monolithic body formed by plastic injection molding of a variety of materials as described herein above.

Figures 12, 13:
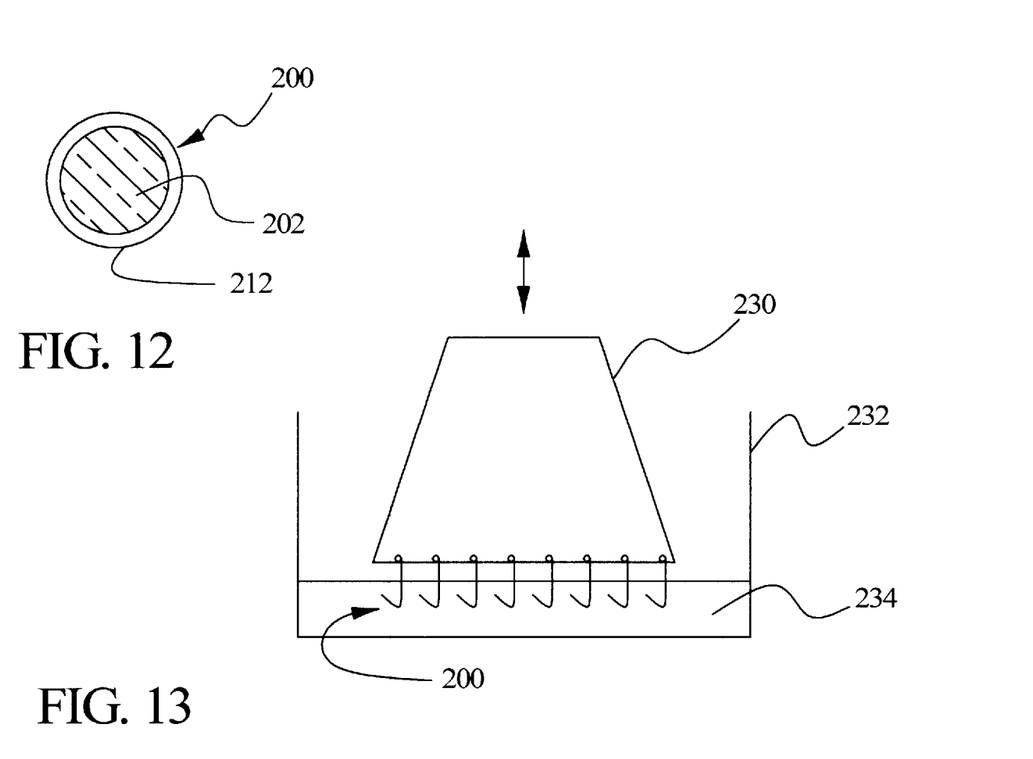
FIG. 12 is a cross sectional view of the fishing hook of FIG. 11 as taken along lines 12—12 of FIG. 11 and illustrating the urethane structural coating applied thereto.
FIG. 13 illustrates a dipping procedure applying a layer of urethane to the fishing hook of FIG. 10.

The overall configuration of fishing hook 200 is more slender than that of the earlier embodiments. In fact, fishing hook 200 closely approximates the dimension of a conventional fishing hook. In the illustrated embodiment, fishing hook 200 is constructed having a diameter on the order of 0.028 inches (28 thousandths of an inch) in its circular cross section, e.g., along shank 202. Such dimension is substantially less than known prior plastic fishing hooks. The more slender design would, without additional support, suffered from undesirable resiliency or deformation under stress. Fishing hook 200 is made more rigid, however, by applying a structural coating to its exterior surface. FIG. 12 illustrates fishing hook 200 in cross section at the shank 202, including the structural coating 212. The preferred form of the present invention employs a urethane material as the coating 212 available from Dexter Corporation-Hysol Division under Product Number PC18.

Urethane is a preferred coating 212 material for a physical, chemical and environmental properties. Urethane as a coating 212 allows a longer shelf life and supports a simple system of use. Such long shelf life allows in the manufacturing process the coating of large quantities of hooks efficiently without time constraint in the curing or set-up process for the coating 212. Also, urethane in its liquid form has a high viscosity. Such high viscosity results in delivery of a relatively large volume of material in each layer of urethane applied. Thus, a minimum number of applications or dipping steps are required to reach a desired coating 212 strength. Preliminary tests by applicant with the urethane coating 212 on a polycarbonate hook 200 has shown that two layers of urethane forming the coating 212 increases the strength of hook 200 by 20% and a single layer increases strength by 10%. Additional layers of urethane in the coating 212 should further increase the strength of hook 200. Accordingly, the coating 212 has proven to significantly increase the structural rigidity of the more slender fishing hook 200.

Another advantage of urethane supporting its use as coating 212 is an ability to provoke controllably a quick curing time. Urethane is moisture cured at room temperature, but can be cured at a faster rate by applying a low temperature condition, e.g., approximately 140 degrees as discussed more fully hereafter.

Urethane also well supports the desirable transparent aspects of a fishing hook under the present invention. Urethane appears very clear both in and out of water, and does not bubble in the application process. Urethane has good flow properties and as applied in the coating 212, results in a smooth layer without any foaming or trapped air in the resulting coating 212. Also, urethane is very hard and has good adhesion properties relative to the body of fishing hook 200. Urethane also is resistent to ultraviolet light and degradation in water.

Generally, urethane is a preferred coating because it offers a simple, commercially feasible method of manufacture increasing the strength of fishing hook 200 without degrading other desirable aspects, i.e., transparency, at the expense of increased structural resistance to deformation under stress as present when engaging a fish in use thereof.

FIG. 13 illustrates a dipping procedure used to develop the coating 212 on fish hook 200. In FIG. 13, a plurality of fish hooks 200 are suspended upon a vertically movable frame 230. A tank 232 contains a body of liquid urethane 234. Frame 230 is moved downward to place fishing hooks 200 within the body of liquid urethane 234. It is suggested that in the dipping of hooks 200 into urethane 234 that the eyelets 204 be maintained out of the urethane bath to avoid clogging. Also, it is suggested that in removing the collection of hooks 200 from urethane 234 that the hooks 200 be dragged lightly against a cloth material to catch any drips developing at the bottoms of the hooks 200. As noted above, liquid urethane 234 exhibits high viscosity and adheres well to the fishing hooks 200. Frame 230 is then raised upward to remove fishing hooks 200 from liquid urethane 234. As a result, fishing hooks 200 now carry a layer of uncured urethane. As the uncured urethane is exposed to moisture, e.g., ambient moisture, the curing process begins. Such curing can occur completely at room temperature, however, for efficient manufacture it may be desirable to increase the curing rate.

Figure 14:
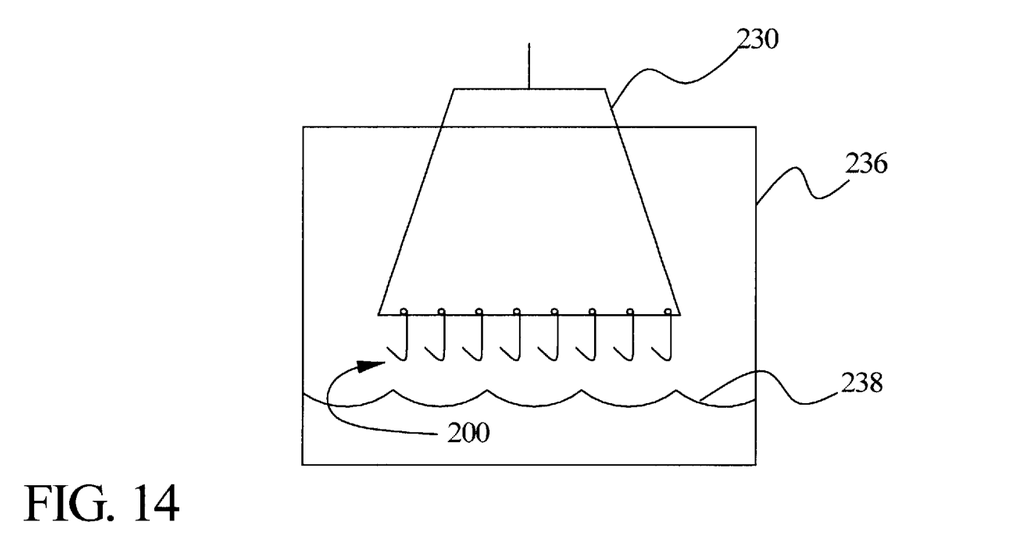
FIG. 14 illustrates a drying or curing procedure executed following the dipping procedure of FIG. 13.

FIG. 14 illustrates a procedure for increasing the curing rate of a layer of urethane upon fishing hooks 200. In FIG. 14, the frame 230 is lowered into an oven 236. Oven 236 includes a heating element 238 and appropriate control elements (not shown) to maintain the temperature within oven 236 at a given level, e.g., 140 degrees Fahrenheit and moisture at between 30–50%. Fishing hooks 200 remain within oven 236 under such conditions until the curing process is complete. The curing time under such conditions is approximately two hours for complete cure, and 30 minutes for tack-free condition. Thus, each layer may be cured to a tack-free condition in preparation for application of a next layer. Ultimately, the hooks 200 should be cured for approximately two hours under the above-stated conditions.

The process of dipping as shown in FIG. 13 and curing as shown in FIG. 14 may be repeated one or more times to develop corresponding one or more layers of urethane on the fishing hooks 200. As a result, the coating 212 applied to each fishing hook 200 may consist of one or more layers of urethane. As may be appreciated, additional layers of urethane are applied when desired to further enhance the structural characteristics of the fishing hooks 200.

Thus, a more slender fishing hook may be provided with appropriate rigidity by application of the urethane coating 212. The urethane coating is not believed to degrade the tip 208 of fishing hooks 200, i.e, tip 208 remains suitably sharp following application of coating 212 to the body of fishing hook 200. Also, the fishing hooks 200 having coating 212 applied thereto appear by inspection to be even more clear, i.e., optically clear, than fishing hooks 200 without a urethane coating 212. The urethane coating 212 thereby supports the desirable characteristic of transparency while concurrently increasing the rigidity of the fish hook 200 and thereby allowing a more slender fish hook design. Generally, plastic fishing hooks suffer from an inability to provide sufficient structural resistance to deformation unless constructed of relatively massive, i.e., large cross section design. Under the present invention, however, fishing hooks 200 more closely approximate a more slender, traditional fishing hook design, but implemented in plastic technology and with the desirable characteristic of transparency maintained.

Thus, an improved fishing hook has been shown and described. Fishing hooks of the present invention may be made transparent by employing transparent base material as described herein above, and may enjoy additional rigidity by application of a urethane coating 212 thereto.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A device for snaring fish, the device comprising:

an elongate transparent shank;

a transparent leg defining a flesh piercing tip;

a transparent arcuate segment integrally connecting the leg and the shank;

a transparent fishing line attachment mechanism integrally coupled to said shank, said transparent shank, leg, arcuate segment and line attachment mechanism having a given rigidity; and a water insolvent transparent structural coating applied to the surface of said shank, transparent leg, arcuate segment and said fishing line attachment mechanism and substantially increasing rigidity of said device relative to said given rigidity.

2. The device according to claim 1 wherein said coating comprises at least one layer of urethane and said shank, transparent leg, arcuate segment and fishing line attachment mechanism comprise a unitary body.

3. The device of claim 1 wherein the transparent material of said shank, leg, arcuate segment, and fishing line attachment mechanism are integrally formed as a unitary body and constructed of one of the materials of polycarbonate, polyetherinmide, fiber-reinforced nylon, glass-reinforced teflon fibers, aerogel, resin, PETG copolyester, glass-reinforced polycarbonate, glass-reinforced nylon, fiber-reinforced polycarbonate, reinforced polypropylene, long fiber-reinforced nylon, long fiber compound, glass fiber-reinforced polypropylene, and reinforced thermoplastics.

4. A device according to claim 1 wherein said device has an index of refraction selected with reference to the index of refraction for a body of water in which the device is to be used.

5. A device according to claim 1 wherein said device has an index of refraction in the range of 1.331 to 1.336.

6. A device for catching fish, the device comprising:

a transparent main body;

means positioned at one end of the main body for securing the main body to a fishing line;

tip means positioned distal of the securing means for engaging fish flesh; and a water insolvent transparent coating applied to said main body to substantially increase the rigidity of said main body.

7. A fishing hook comprising:

a transparent body including a shank, a flesh-piercing tip, and an arcuate segment integrally connecting the leg and the shank to form a fishhook shape; and a water insolvent transparent structural coating surrounding said body and substantially increasing the structural rigidity of said body.

8. A fishing hook according to claim 7 wherein said body and said coating are distinct materials.

9. A fishing hook according to claim 7 wherein said coating applied to the surface of said body by dipping said body in a liquid form of said coating.

10. A fishing hook according to claim 7 wherein said coating comprises one layer of urethane and said body comprises a monolithic structure.

11. A fishing hook according to claim 7 wherein said body comprises a monolithic structure formed of one of the materials of polycarbonate, polyetherinimide, fiber-reinforced nylon, glass-reinforced Teflon fibers, aerogel, resin, PETG copolyester, glass-reinforced polycarbonate, glass-reinforced nylon, fiber-reinforced polycarbonate, reinforced polypropylene, long fiber-reinforced nylon, long fiber compound, glass fiber-reinforced polypropylene, and reinforced thermoplastics.

* * * * *